(12) United States Patent
Deng et al.

(10) Patent No.: US 11,021,232 B2
(45) Date of Patent: Jun. 1, 2021

(54) DRIVING DEVICE, PROPELLER, AND PROPULSION SYSTEM

(71) Applicant: SZ DJI TECHNOLOGY CO., LTD., Shenzhen (CN)

(72) Inventors: Tao Deng, Shenzhen (CN); Ruochen Tang, Shenzhen (CN); Yueyao Tu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 143 days.

(21) Appl. No.: 16/288,391

(22) Filed: Feb. 28, 2019

(65) Prior Publication Data
US 2019/0193834 A1   Jun. 27, 2019

Related U.S. Application Data

(63) Continuation of application No. PCT/CT2016/097589, filed on Aug. 31, 2016.

(51) Int. Cl.
*B64C 11/04* (2006.01)
*B63H 1/20* (2006.01)
(Continued)

(52) U.S. Cl.
CPC .............. *B64C 11/04* (2013.01); *A63H 27/02* (2013.01); *B63H 1/20* (2013.01); *B63H 23/34* (2013.01);
(Continued)

(58) Field of Classification Search
CPC ........ A63H 27/02; A63H 27/12; B64C 11/04; B64C 2201/165; B64C 2201/108;
(Continued)

(56) References Cited

U.S. PATENT DOCUMENTS

| 4,606,671 A | 8/1986 | Rasmussen |
| 9,079,115 B2 * | 7/2015 | Huang .................. A63H 27/02 |

(Continued)

FOREIGN PATENT DOCUMENTS

| CN | 203832751 U | 9/2014 |
| CN | 105173072 A | 12/2015 |

(Continued)

OTHER PUBLICATIONS

The World Intellectual Property Organization (WIPO) The International Search Report and Written Opinion for PCT/CN2016/097589 dated Jun. 5, 2017 6 pages.

*Primary Examiner* — J. Todd Newton
*Assistant Examiner* — Andrew J Marien
(74) *Attorney, Agent, or Firm* — Anova Law Group, PLLC

(57) ABSTRACT

An unmanned aerial vehicle includes a propulsion system including a driving device having a main body, a driving shaft rotatable relative to the main body, and a locking member disposed on the main body. The locking member includes at least one snap-fitting member. The propulsion system also includes a propeller coupled with the driving device, the propeller including a blade base and a blade mounted on the blade base. The at least one snap-fitting member is configured to snap-fit with the propeller. The propulsion system also includes an elastic abutting member sleeve coupled with the driving shaft, a first installation foolproof member disposed on the blade base, and a second installation foolproof member disposed on the locking member.

19 Claims, 8 Drawing Sheets

(51) Int. Cl.
    *B64D 35/00*     (2006.01)
    *A63H 27/00*     (2006.01)
    *B63H 23/34*     (2006.01)
    *B64C 27/32*     (2006.01)
    *B64C 39/02*     (2006.01)

(52) U.S. Cl.
    CPC ............ *B64C 27/32* (2013.01); *B64C 39/024* (2013.01); *B64D 35/00* (2013.01); *B63H 2023/342* (2013.01); *F16C 2226/70* (2013.01); *F16C 2226/74* (2013.01)

(58) Field of Classification Search
    CPC .. F16C 2226/70; F16C 2226/74; B63H 23/34; B63H 2023/342; B63H 1/20; B64D 35/00
    USPC ........ 416/2, 60, 169 R, 170 R; 415/9, 122.1, 415/123, 124.2
    See application file for complete search history.

(56) References Cited

U.S. PATENT DOCUMENTS

2015/0129711 A1*   5/2015   Caubel .................. A63H 27/12
                                                   244/17.23
2017/0305542 A1*   10/2017   Zhang .................. B64C 39/024

FOREIGN PATENT DOCUMENTS

| CN | 204956901 U | 1/2016 |
| CN | 205034340 U | 2/2016 |
| CN | 105517890 A | 4/2016 |
| CN | 105517892 A | 4/2016 |
| CN | 105564635 A | 5/2016 |
| CN | 105711815 A | 6/2016 |
| CN | 105857577 A | 8/2016 |
| CN | 205469777 U | 8/2016 |
| CN | 206107533 U | 4/2017 |
| CN | 207120874 U | 3/2018 |

* cited by examiner

DRIVING DEVICE, PROPELLER, AND PROPULSION SYSTEM

CROSS-REFERENCE TO RELATED APPLICATION

This application is a continuation application of International Application No. PCT/CN2016/097589, filed on Aug. 31, 2016, the entire contents of which are incorporated herein by reference.

TECHNICAL FIELD

The present disclosure relates to the technology field of driving devices, propellers, and propulsion systems that use the driving devices and propellers.

BACKGROUND

Propellers are widely used in aircrafts and ships as propulsion devices. A propeller includes one or more blades, a base onto which the blades are mounted. A driving shaft is coupled with the base. The driving shaft rotates under the drive of a motor, causing the blades to rotate. Conventionally, the base and the driving shaft are fixedly connected with one another through tight fitting threads.

When the base and the driving shaft are fixedly connected through the tight fitting threads, the rotation direction of the base is the same as the rotation direction of the blades during operation. Typically, during startup and normal operation, the connection between the blades and the driving shaft is good. However, when the blades reduce speed abruptly, or when the blades experience a relatively large change in acceleration, under the effect of the acceleration, the connection between the base and the driving shaft may become loose. In addition, when the amplitude of vibration is relatively large, the connection between the base and the driving shaft may also become loose, which in turn causes the blades to be ejected from the propeller. When the blades are ejected from the propeller, the propeller needs to be disassembled using special tools.

SUMMARY

In accordance with the present disclosure, there is provided an unmanned aerial vehicle that includes a propulsion system having a driving device having a main body, a driving shaft rotatable relative to the main body, and a locking member disposed on the main body. The locking member includes at least one snap-fitting member. The propulsion system also includes a propeller coupled with the driving device, the propeller including a blade base and a blade mounted on the blade base. The at least one snap-fitting member is configured to snap-fit with the propeller. The propulsion system also includes an elastic abutting member sleeve coupled with the driving shaft, a first installation foolproof member disposed on the blade base, and a second installation foolproof member disposed on the locking member. The first installation foolproof member and the second installation foolproof member are configured to stagger from one another to allow the propeller to be mounted to the locking member when the propeller is mounted to the locking member in a first direction, and couple with one another to restrain the propeller from being mounted to the locking member, when the propeller is mounted to the locking member in a second direction different from the first direction.

In various embodiments of the present disclosure, the driving device of the propulsion system is provided with an elastic abutting member and a locking member. The locking member is provided with at least one snap-fitting member for snap-fitting with the propeller. The propeller is provided with a matching fastening member configured to engage with the snap-fitting member. The elastic abutting member is configured to abut against the driving device and the propeller. The disclosed structure not only makes disassembling easy, but also provides a locking function. The locking function helps prevent the connections between various components becoming loose, thereby preventing the ejection of the blades from the propeller.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

LIST OF ELEMENTS

Figure 1:
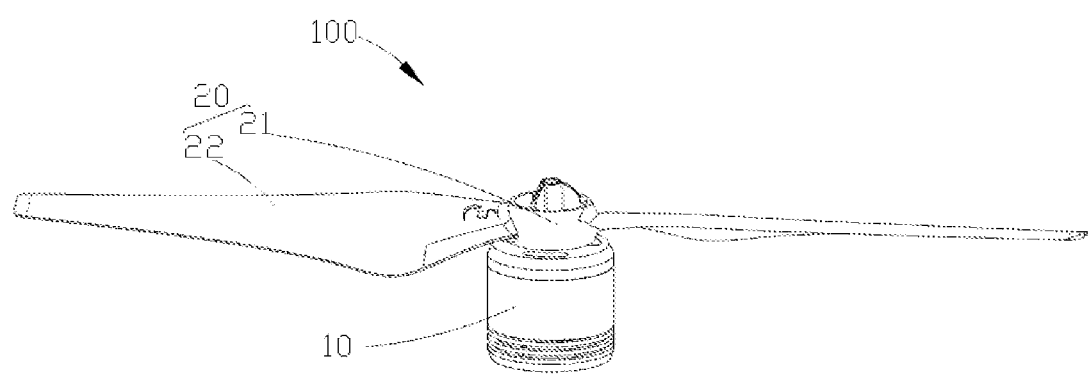
FIG. 1 is a schematic perspective view of an assembled propulsion system according to an example embodiment.

| | |
|---|---|
| Propulsion system | 100, 100a |
| Driving device | 10, 10a |
| Main body | 12, 12a |
| Support surface | 120, 120a |
| Positioning groove | 1200, 1200a |
| First mounting hole | 1201, 1201a |
| Elastic abutting member | 13 |
| Locking member | 14, 14a |
| Snap-fitting member | 140, 140a |
| Connecting plate | 141 |
| Through holes | 1410, 1410a |
| Second mounting hole | 1411, 1411a |
| Protruding column | 142 |
| Fitting block | 143 |
| Positioning member | 144, 144a |
| Receiving groove | 145, 145a |
| Stepping block | 146 |

-continued

| | |
|---|---|
| Driving shaft | 15 |
| Propeller | 20, 20a |
| Blade base | 21, 21a |
| Connecting surface | 211, 211a |
| Blade | 22, 22a |
| Receiving hole | 23 |
| Fastening member | 230, 230a |
| Rib | 231, 231a |
| Blocking strip | 232, 232a |
| Connecting column | 2310 |
| Connecting hole | 2311, 2311a |
| Reinforcing plate | 24 |
| Installation foolproof member | 25 |
| First installation foolproof member | 25a |
| Second installation foolproof member | 25b |
| Assembly entry | 26, 26a |

The detailed implementation of the embodiments will be explained with reference to the accompanying drawings.

DETAILED DESCRIPTION OF THE EMBODIMENTS

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless.

When a first component is referred to as "disposed," "located," or "provided" on a second component, the first component may be directly disposed, located, or provided on the second component or may be indirectly disposed, located, or provided on the second component via an intermediate component. The term "on" does not necessarily mean that the first component is located higher than the second component. In some situations, the first component may be located higher than the second component. In some situations, the first component may be disposed, located, or provided on the second component, and located lower than the second component. In addition, when the first item is disposed, located, or provided "on" the second component, the term "on" does not necessarily imply that the first component is fixed to the second component. The connection between the first component and the second component may be any suitable form, such as secured connection (fixed connection) or movable contact.

When a first component is referred to as "disposed," "located," or "provided" in a second component, the first component may be partially or entirely disposed, located, or provided in, inside, or within the second component. When a first component is coupled, secured, fixed, or mounted "to" a second component, the first component may be is coupled, secured, fixed, or mounted to the second component from any suitable directions, such as from above the second component, from below the second component, from the left side of the second component, or from the right side of the second component.

The terms "perpendicular," "horizontal," "left," "right," "up," "upward," "upwardly," "down," "downward," "downwardly," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure.

In addition, the singular forms "a," "an," and "the" are intended to include the plural forms as well, unless the context indicates otherwise. And, the terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C.

When a first item is fixedly coupled, mounted, or connected to a second item, the term "fixedly" means "securely," and is relative to movably. When the first item is fixedly coupled, mounted, or connected to the second item, the first item does not move relative to the second item. The first item may be permanently coupled to the second item, or may be detachably coupled to the second item. When a first item is "fixed" with a second item, the first item is securely connected with the second item. The connection may be permanent or detachable.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following descriptions explain example embodiments of the present disclosure, with reference to the accompanying drawings. Unless otherwise noted as having an obvious conflict, the embodiments or features included in various embodiments may be combined.

The following embodiments do not limit the sequence of execution of the steps included in the disclosed methods. The sequence of the steps may be any suitable sequence, and certain steps may be repeated.

As shown in FIGS. 1-4, in an example embodiment of the present disclosure, a propulsion system 100 includes a driving device 10 and a propeller 20. The driving device 10 and the propeller 20 are connected with one another. The driving device 10 is configured to drive the propeller 20 to rotate. The propulsion system 100 may be used in an unmanned aerial vehicle ("UAV"), an unmanned water surface vehicle (such as boat, ship, etc.), or an unmanned under water vehicle (such as submarine, unmanned robot, etc.).

In some embodiments, the driving device 10 may include a main body 12, and an elastic abutting member 13 disposed on the main body 12. The driving device 10 may include a locking member 14 disposed on the main body 12. The driving device 10 may also include a driving shaft 15 disposed on the main body 12 and configured to be rotatable relative to the main body 12.

In some embodiments, the main body 12 may include a support surface 120 that may be disposed adjacent the propeller 20. The main body 12 may have a cylindrical shape, although in other embodiments, the main body 12 may have other suitable shapes. The driving shaft 15 may be disposed at a center location of the main body 12, protruding from the main body 12. The support surface 120 may be provided with one or more positioning grooves 1200. In some embodiments, each of the one or more positioning grooves 1200 may have a ring shape. The one or more positioning grooves 1200 may be disposed surrounding the driving shaft 15. At a center location of the support surface 120 surrounded by the one or more positioning grooves 1200, there may be multiple first mounting holes 1201. The positioning grooves 1200 and the multiple first mounting holes 1201 may be configured for connecting the locking member 14.

It is understood that the shape of the one or more positioning grooves 1200 is not limited to the ring shape. Depending on the applications and needs, other suitable shapes, such as square or triangle, may be used.

Figure 2:
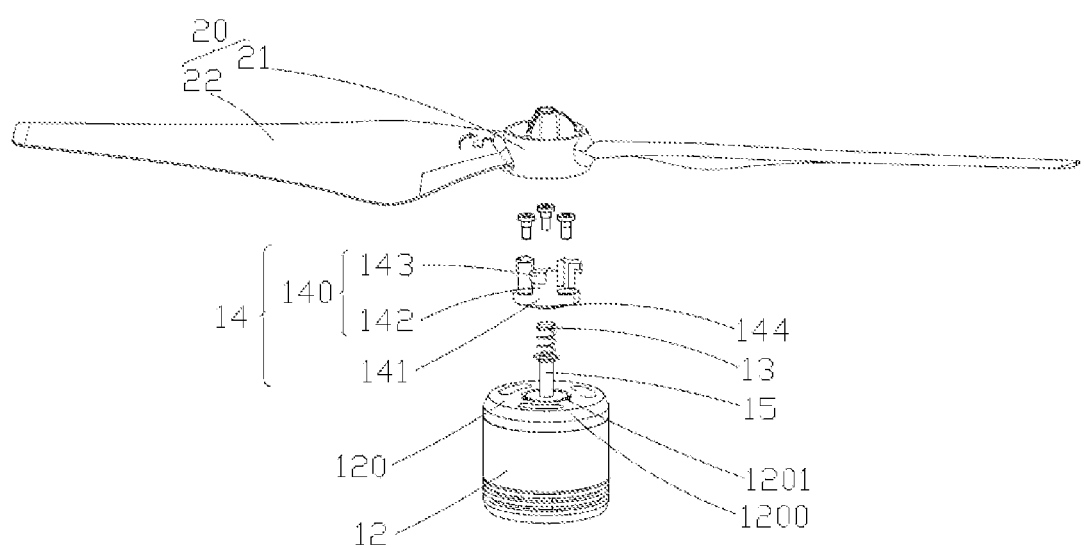
FIG. 2 is a schematic exploded view of the propulsion system of FIG. 1, according to an example embodiment.
Figure 3:
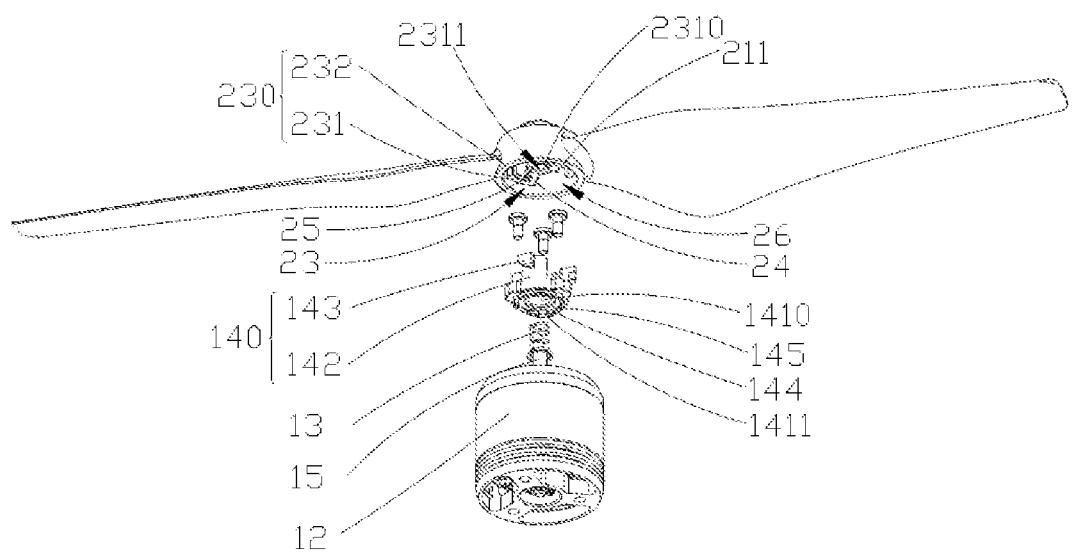
FIG. 3 is an exploded view of the propulsion system of FIG. 2 from another perspective, according to an example embodiment.
Figure 4:
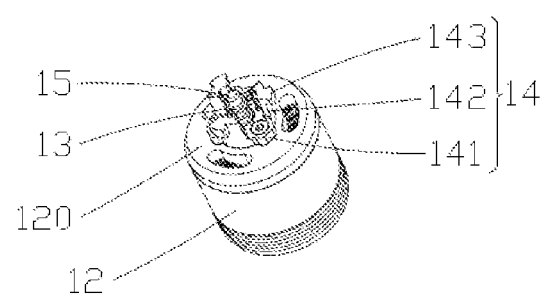
FIG. 4 is a perspective view of an assembled driving device shown in FIG. 1, according to an example embodiment.
Figure 5:
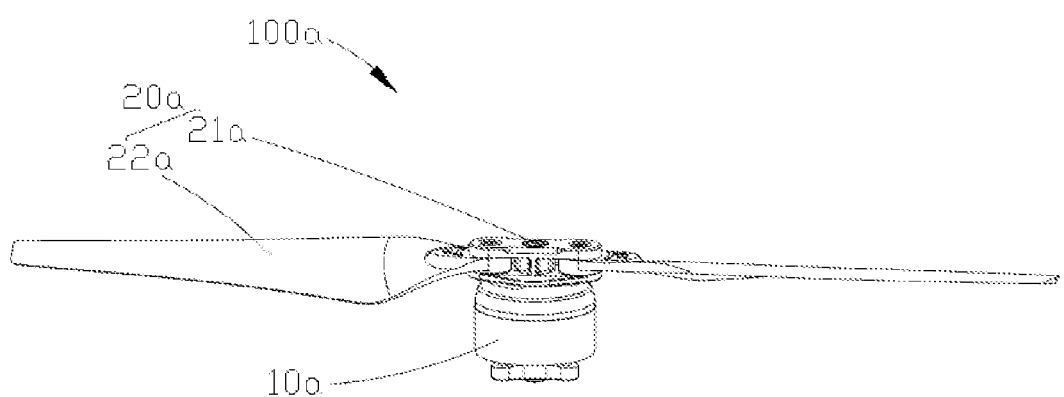
FIG. 5 is a schematic perspective view of an assembled propulsion system according to another example embodiment.

In some embodiments, the elastic abutting member 13 may be sleeve coupled with the driving shaft 15 to surroundingly mount on the driving shaft 15, as shown in FIG. 2. The elastic abutting member 13 is an elastic component. For example, the elastic abutting member 13 may be a spring, as shown in FIG. 2. The spring may be sleeved onto the driving shaft 15. When the spring is compressed in one direction, the spring provides an elastic resilient force in the opposite direction.

In some embodiments, the locking member 14 includes a connecting plate 141. The connecting plate 141 may have a substantially round shape. In other embodiments, the connecting plate 141 may have other suitable shapes, such as rectangle, square, etc. The connecting plate 141 may include a through hole 1410 at a location corresponding to the driving shaft 15, to receive the driving shaft 15. The driving shaft 15 may penetrate throughout the through hole 1410. The connecting plate 141 may include a plurality of second mounding holes 1411 corresponding to a plurality of first mounting holes 1201 of the main body 12. The second mounting holes 1411 and the first mounting holes 1201 may correspond to one another, through which the locking member 14 may be connected with the main body 12.

The locking member 14 may include at least one snap-fitting member 140 that may snap-fit with the propeller 20. The snap-fitting member 140 may include a hook structure. In some embodiments, the snap-fitting member 140 may include a protruding column 142 and a fitting block 143. The protruding column 142 may protrude from the connecting plate 141. For example, the protruding column 142 may extend toward the propeller 20 in a direction perpendicular to the connecting plate 141. The fitting block 143 may be formed at an end of the protruding column 142. In some embodiments, the propulsion system 100 may include a plurality of snap-fitting members 140, such as three or other suitable numbers. The three snap-fitting members 140 may be disposed along the outer periphery of the connecting plate 141 in a ring shape.

In some embodiments, the locking member 14 may include a positioning member 144. The positioning member 144 may be disposed on a surface of the locking member 14 that faces the main body 12. In some embodiments, the positioning member 144 is a blocking ring formed by a protruding bottom portion of the connecting plate 141. In some embodiments, the positioning member 144 may surround the through hole 1401. In some embodiments, the shape and size of the positioning member 144 may be the same as or similar to the shape and size of the positioning groove 1200 of the main body 12. When the locking member 14 is mounted to the main body 12, the positioning member 144 may be received in the positioning groove 1200, such that the locking member 14 and the main body 12 are preliminarily aligned, making it convenient to subsequently fasten both together.

In some embodiments, the positioning member 144 (e.g., blocking ring) may form a receiving groove 145 at the bottom of the locking member 14. An end of the elastic abutting member 13 may be received in the receiving groove 145. When the locking member 14 is mounted to the main body 12, the elastic abutting member 13 may be restrained on the main body 12 from moving axially. In some embodiments, when the elastic abutting member 13 is a spring, the spring may include a first portion with a first diameter and a second portion with a second diameter. The first diameter may be smaller than the second diameter. The first diameter may be slightly larger than the diameter of the driving shaft 15, such that the first portion can be sleeved onto the driving shaft 15 just right. The second portion with the second diameter may be located at a lower portion of the spring, and may be at least partially received in the receiving groove 145. In some embodiments, when the locking member 14 is securely mounted to the main body 12, the lower portion of the spring (i.e., the second portion of the spring with the second diameter) may abut against by the locking member 14. As a result, the spring may be restrained by the locking member 14 at the location adjacent the main body 12, and cannot move axially along the driving shaft 15.

During assembly, the elastic abutting member 13 may be sleeved onto the driving shaft 15. Then the connecting plate 141 of the locking member 14 may be placed onto the support surface 120. The driving shaft 15 may be inserted into the through hole 1410 of the connecting plate 141. The positioning member 144 of the locking member 14 may face the support surface 120 of the main body 12. The positioning member 144 may be received in the positioning groove 1200 of the main body 12. The multiple second mounting holes 1411 may be aligned with the first mounting holes 1201. A fastening element may be inserted through the second mounting holes 1411 and the first mounting holes 1201 to secure the locking member 14 onto the main body 12. In some embodiments, the first mounting holes 1201 may be holes with threads. In some embodiments, the second mounting holes 1411 may be through holes. By inserting a threaded nail or a threaded rod through the second mounting holes 1411 and the first mounting holes 1201, the elastic abutting member 13 and the locking member 14 may be securely mounted onto the main body 12.

In some embodiments, the elastic abutting member 13 and the locking member 14 may also be securely mounted onto the main body 12 through other fastening means, such as by gluing or welding.

In some embodiments, the receiving groove 145 may be omitted. The elastic abutting member 13 may be mounted onto the support surface 120 directly.

In some embodiments, the propeller 20 may include a blade base 21 and two or more blades that are mounted on the blade base 21. In some embodiments, the blade base 21 and the blades 22 may form an integral piece manufactured by injection molding. In some embodiments, the blade base 21 may be detachably provided at the locking member 14. A connecting surface 211 of the blade base 21 that is disposed opposite the support surface 120 may include a receiving hole 23. The shape and size of the receiving hole 23 may be similar to or the same as the shape and size of the locking member 14. That is, the receiving hole 23 may fit with the locking member 14. In some embodiments, a connecting column 2310 may be disposed in the receiving hole 23. In some embodiments, the connecting column 2310 may have a cylindrical shape. In some embodiments, the receiving column 2310 may include at least one connecting hole 2311 configured to receive the driving shaft 15. In some embodiments, in order to increase the connection stiffness between the connecting hole 2311 and the driving shaft 15, and to restrain the connecting column 2310 from becoming broken in the event the blades are ejected from the propeller 20, an outer side wall of the connecting column 2310 may include one or more reinforcing plates 24. Any suitable number of reinforcing plates 24 may be included. For example, in some embodiments, there may be three reinforcing plates 24. The three reinforcing plates 24 may be evenly distributed along the outer side wall of the connecting column 2310 and may extend from the outer side wall to an inner wall of the receiving hole 23. In some embodiments, the reinforcing plates 24 may extend outwardly and divergently from the outer side wall of the connecting column 2310. It is understood that the number of the reinforcing plates 24 is not limited to three. The number can be two, four, or more than four. The present disclosure does not limit the number of the reinforcing plates 24.

In some embodiments, the inner wall of the receiving hole 23 is provided with three fastening members 230 corresponding to three snap-fitting members 140. Each of the fastening members 230 may include a rib 231 and a blocking strip 232. The rib 231 may extend along an arc shape from an end portion of the reinforcing plate 24 along the inner wall of the connecting column 2310. The blocking strip 232 may be disposed at an end portion of the rib 231, and may be disposed in a rotation direction of the blade when the blade is in operation. In some embodiments, the blocking strip 232 and the rib 231 may be perpendicular to one another. The blocking strip 232 may be configured to block the fitting block 143 of the snap-fitting member 140 of the locking member 14. In some embodiments, the height of the blocking strip 232 is greater than the height of the rib 231. In some embodiments, the rib 231 and the blocking strip 232 are disposed in the rotation direction of the blade 22 when the blade 22 is in operation. An assembly entry 26 may be provided between every two blocking strips 232 and the reinforcing plate 24.

The reinforcing plate 24 may include an installation foolproof member 25 provided in the rotation direction of the blade 22. Each of the installation foolproof member 25 and the corresponding rib 231 may be disposed on the same side of the reinforcing plate 24. The rib 231 may be provided at an end portion of the reinforcing plate 24. The installation foolproof member 25 may be provided at another end portion of the reinforcing plate 24 and may be disposed adjacent the outer wall of the connecting column 2310.

It is understood that in some embodiments, not all of the three fastening members 230 need to be provided with the rib 231 and the blocking strip 232. In some embodiments, at least one of the three fastening members 230 may be provided with the rib 231 and the blocking strip 232. For example, two of the reinforcing plates 24 included in two of the three fastening members 230 may be provided with the rib 231 and the blocking strip 232, and one of the reinforcing plates 24 included in one of the three fastening members 230 may not be provided with the rib 231 and the blocking strip 232. Alternatively, one of the three reinforcing plates 24 may be provided with the rib 231 and the blocking strip 232, and the other two of the three reinforcing plates 24 may not be provided with the rib 231 and the blocking strip 232. The present disclosure is not limited to the above arrangements.

When assembling the propulsion system, the driving shaft 15 may be inserted into the connecting hole 2311 through interference fitting, to determine the degree of concentricity and degree of perpendicularity. The fitting block 143 of the locking member 14 may be inserted into the receiving hole 23 through the assembly entry 26 of the propeller 20. The three fitting blocks 143 may be respectively located between the reinforcing plate 24 and the blocking strip 232 that are located within the receiving hole 23 of the propeller 20. Subsequently, the blade base 21 of the propeller 20 may be pressed down. The elastic abutting member 13 may deform when pressed by the connecting hole 2311. The propeller 20 may be rotated toward the assembly entry direction to cause the fitting block 143 to pass the blocking strip 232 and move into a location adjacent the rib 231. When the force pressing down the propeller 20 is released, because the elastic abutting member 13 elastically abuts the blade base 21, under the elastic force of the elastic abutting member 13, each fitting block 143 may be engaged with a corresponding rib 231. Through these operations, the propeller 20 may be disposed in a locked state.

When disassembling the propeller 20 from the driving device 10, the blade base 21 may be pressed down. The elastic abutting member 13 may be compressed by the blade base 21, causing the fitting block 143 to pass the blocking strip 232. The propeller 20 may be rotated in a direction opposite the assembly entry direction. Through these operations, the propeller 20 may be disposed in an unlocked state. The blocking strip 143 may be detached from a side of the blocking strip 232, and may be withdrawn into the assembly entry 26, thereby separating the propeller 20 from the driving device 10.

It is understood that in some embodiments, the elastic abutting member 13 may be other type of elastic member disposed on the support surface 120, as long as the other type of elastic member can be sleeved onto the driving shaft 15.

The driving device of the propulsion system of the present disclosure is provided with the elastic abutting member and the locking member. The locking member is provided with at least one snap-fitting member to snap-fit with the propeller. The inner wall of the receiving hole of the propeller includes at least one fitting block to engage with the at least one snap-fitting member. The elastic abutting member abuts against a connecting surface. The structural configuration of the present disclosure not only enables easy disassembling, but also provides a locking function, thereby restraining components of the propulsion system from becoming loose in operation, as well as restraining the blades of the propeller from being ejected.

Referring to FIGS. 5-8, another example embodiment of the present disclosure includes a propulsion system 100*a*. The propulsion system 100*a* may include a driving device 10*a* and a propeller 20*a*. Similar to the embodiment discussed above in connection with FIGS. 1-4, the driving device 10*a* may include a main body 12*a*, an elastic abutting member 13*a* disposed on the main body 12*a*, a locking member 14*a* mounted on the main body 12*a*, and a driving shaft 15 mounted on the main body 12*a* and configured to be rotatable relative to the main body 12*a*. The structures of the main body 12*a* and the locking member 14*a* of the driving device 10*a* may be different from the structure of the main body 12 and the locking member 14 of the embodiment shown in FIGS. 1-4. The structures and the connection mechanism of the propeller 20*a* and the locking member 14*a* may be different from the structures and the connection mechanism of the propeller 12 and the locking member 14 of the embodiment shown in FIGS. 1-4. The differences will be described below.

Figure 6:
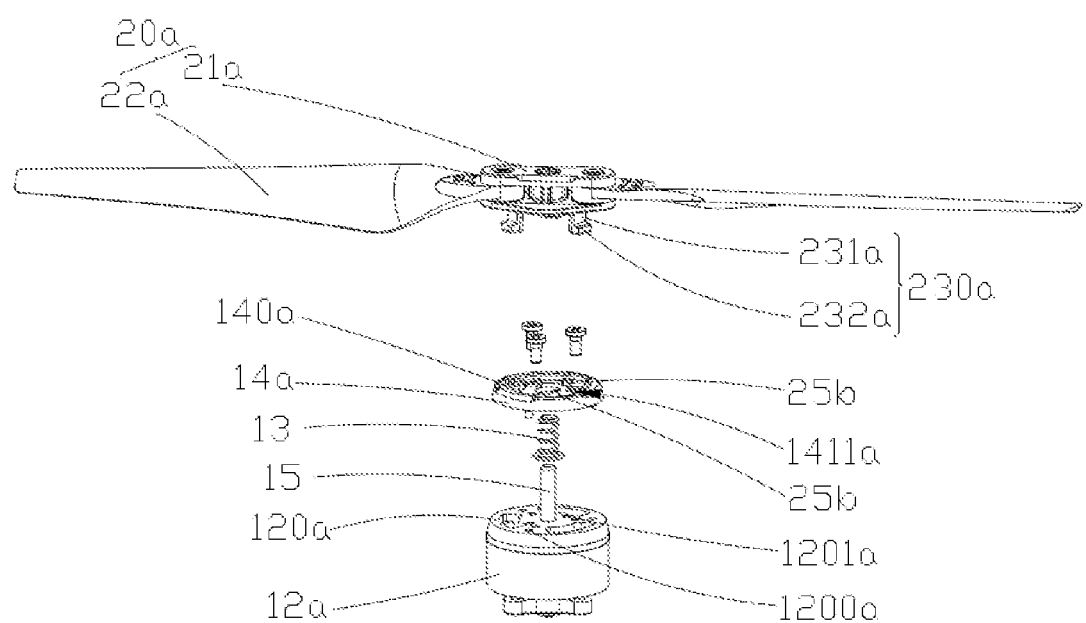
FIG. 6 is a schematic exploded view of the propulsion system of FIG. 5, according to another example embodiment.
Figure 7:
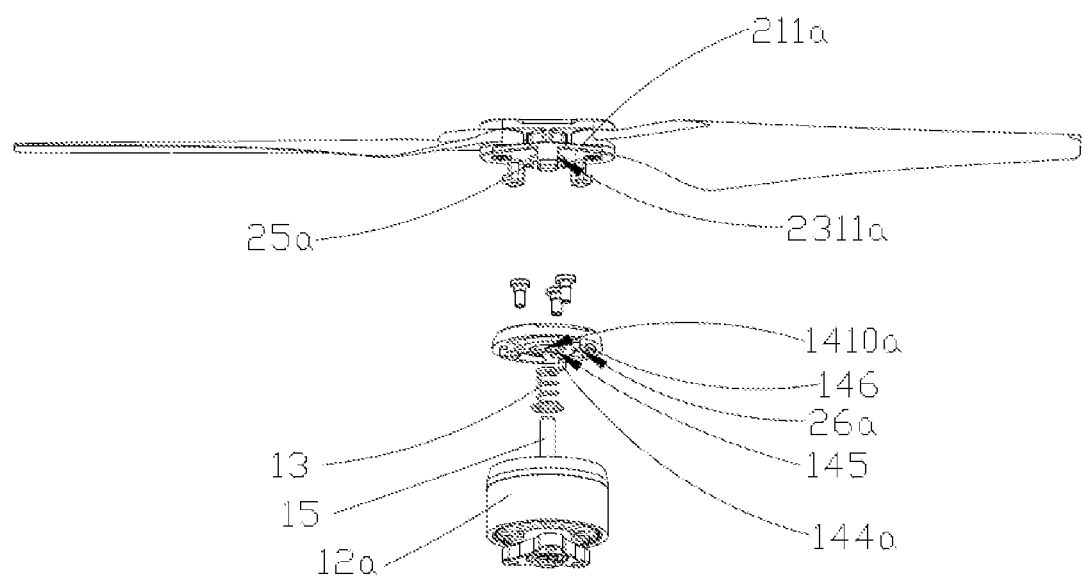
FIG. 7 is a schematic exploded view of the propulsion system of FIG. 6 from another perspective, according to another example embodiment.
Figure 8:
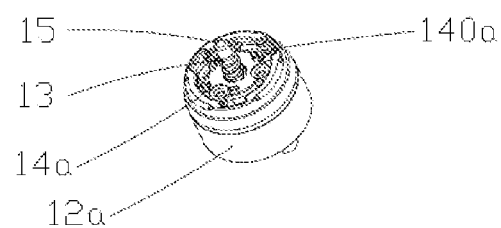
FIG. 8 is schematic perspective view of an assembled driving device shown in FIG. 5, according to another example embodiment.

As shown in FIG. 6, the main body 12*a* may include a support surface 120*a*. In this embodiment, the positioning groove 1200*a* is different from the positioning groove 1200 in the embodiment shown in FIGS. 1-4. The positioning groove 1200*a* includes a plurality of separate circular holes, rather than a ring shaped structure, as included in the positioning groove 1200. The circular holes may surround the driving shaft 15 in a ring shaped array.

In the embodiment shown in FIGS. 5-8, the sleeve coupling between the elastic abutting member 13 and the driving shaft 15 is the same as that of the embodiment shown in FIGS. 1-4.

In the embodiment shown in FIGS. 5-8, the locking member 14*a* may include at least one snap-fitting member 140*a* configured to snap-fit with the propeller 20*a*. The structure of the snap-fit member 140*a* may be different from the structure of the snap-fit member 140 of the embodiment shown in FIGS. 1-4. In the embodiment shown in FIGS. 5-8, the snap-fit member 140*a* may include a plurality of perforations or through holes. Each perforation or through hole may include a stepping block 146 disposed therein. The stepping block 146 may be provided on one side of the perforation. The height of the stepping block 146 may be smaller than the depth of the perforation. Thus, the stepping block 146 may block a portion of the perforation. The other portion of the perforation that is not blocked by the stepping block 146 may form the assembly entry 26*a* extending throughout of the locking member 14*a*. The locking member 14*a* may have a substantially circular shape. In some embodiments, the shape of the locking member 14*a* may be adjusted based on applications, and may be rectangle, square, etc. The locking member 14*a* may include a through hole 1410*a* at a location corresponding to the driving shaft 15, such that the driving shaft 15 may penetrate into the through hole 1410*a*. Each perforation may extend in a curved shape from the rotation axis of the through hole 1410*a*.

The locking member 14*a* may include a plurality of second mounting holes 1411*a* corresponding to the locations of the first mounting holes 1201*a*. In some embodiments, the second mounting holes 1411*a* correspond one to one with the first mounting holes 1201*a*.

In some embodiments, the locking member 14*a* may include a positioning member 144*a* provided on a surface of the locking member 14*a* facing the main body 12*a*. In some embodiments, the positioning member 144*a* may include a plurality of cylindrical rods protruding from a bottom portion of the locking member 14*a*. The number and the locations of the cylindrical rods may be similar to those of the positioning groove 1200*a*. When the locking member 14*a* is mounted onto the main body 12*a*, the plurality of positioning member 144*a* may be received in the corresponding positioning groove 1200*a* to preliminarily align the locking member 14*a* and the main body 12*a*, making it convenient for the locking member 14*a* and the main body 12*a* to be securely engaged with one another.

A side of the locking member 14*a* that is adjacent the main body 12*a* may include a depression forming a receiving groove 145*a*. The receiving groove 145*a* may share the same axis with the through hole 1401*a*. In some embodiments, an end of the elastic abutting member 13 may be received in the receiving groove 145*a*, and may be restrained on the main body 12*a*.

During assembly, the elastic abutting member 13 may be sleeved onto the driving shaft 15. The locking member 14*a* may be placed onto the support surface 120*a*. The driving shaft 15 may be inserted into the through hole 1410*a* of the locking member 14*a*. The positioning member 144*a* of the locking member 14*a* may face the support surface 120*a* of the main body 12*a*. While the positioning member 144*a* is received in the positioning groove 1200*a* of the main body 12*a*, the plurality of second mounting holes 1411*a* may be aligned one to one with the plurality of first mounting holes 1201*a*. Finally, the locking member 14*a* may be secured to the main body 12*a* through a fastening member.

In some embodiments, the propeller 20*a* may include a blade base 21*a* and two or more blades 22 that are mounted on the blade base 21*a*. The blade base 21*a* may be detachably provided at the locking member 14*a*. A connecting surface 211*a* of the blade base 21*a* that faces the support surface 120*a* may include connecting holes 2311 configured to receive the driving shaft 15.

In some embodiments, the connecting surface 211*a* may include three fastening members 230*a* provided at locations corresponding to the three snap-fitting members 140*a*. Each fastening member 230*a* may include a rib 231*a* and a blocking strip 232*a*. The rib 231*a* may extend perpendicularly from the connecting surface 211*a*. The blocking strip 232*a* may be provided at an end of the rib 231*a* and may protrude in a direction that is away from the connecting hole 2311*a*. The blocking strip 232*a* and the rib 231*a* may be perpendicular to each other. In some embodiments, the number of the ribs 231*a* may be three. The three ribs 231*a* may surround the connecting hole 2311*a* in a ring-shaped array. It is understood that the number of the ribs 231*a* may be other suitable number, such as one, two, four, etc.

A first installation foolproof member 25*a* may be provided between each rib 231*a* and the connecting hole 2311*a*. The first installation foolproof member 25*a* may be disposed on the blade base 21*a*, and may extend in the same direction as the rib 231*a*. In some embodiments, a second installation foolproof member 25*b* may be provided on the locking member 14*a*. The second installation foolproof member 25*b* may extend in a direction opposite the direction in which the first installation foolproof member 25*a* extends. The first installation foolproof member 25*a* and the second installation foolproof member 25b may have the same height, and their locations may be complementary. When the locking member 14a is lockingly connected with the propeller 20a, the first installation foolproof member 25a and the second installation foolproof member 25b may function to avoid mismatch or mis-mounting between the propeller and the motor. When the propeller 20a is connected with the locking member 14a in a first, correct direction, the first installation foolproof member 25a and the second installation foolproof member 25b can be staggered from each other (e.g., do not align and dock with each other), thereby allowing mounting of the propeller 20a and the locking member 14a. When the propeller 20a is connected with the locking member in a second, incorrect direction that is different from the first direction, the first installation foolproof member 25a and the second installation foolproof member 25b may be coupled or docked with each other, thereby increasing the mounting distance between the propeller 20a and the locking member 14a, and retraining the propeller 20a from being connected with the locking member 14a.

During assembly, the driving shaft may be inserted into the connecting hole 2311a through interference fitting. The degree of concentricity and degree of perpendicularity may be determined. The blocking strip 232a of the blade base 21a may extend into the assembly entry 26a through the snap-fitting member 140a of the locking member 14a. Subsequently, the blade base 21a of the propeller 20a may be pressed downwardly. The elastic abutting member 13 deforms when pressed by the connecting hole 2311a. The propeller 20a may be rotated in a direction of the assembly entry, such that the blocking strip 232a and may be disposed under the stepping block 146 of the locking member 14a. When the downward pressing force applied on the propeller 20a is released, because the elastic abutting member 13 elastically abuts the blade base 21a, under the elastic force of the elastic abutting member 13, each blocking strip 232a may snap-fit with a corresponding stepping block 146, thereby placing the propeller 20a in a locked state.

When the propeller 20a is to be disassembled from the driving device 10a, the blade base 21a may be pressed down. The elastic abutting member 13 may be pressed by the blade base 21a and shrinks, causing the blocking strip 232a to move away from the stepping block 146. The propeller 20a may then be rotated in a direction opposite the assembly entry direction. After these operations, the propeller 20a may be placed in an unlocked state. The blocking strip 232a may be separated from the side of the stepping block 146. The blocking strip 232a may withdraw into the assembly entry 26a, thereby separating the propeller 20a from the driving device 10a.

A person having ordinary skill in the art can appreciate that part or all of the above disclosed methods and processes may be implemented using related electrical hardware, or a combination of electrical hardware and computer software that may control the electrical hardware. Whether the implementation is through hardware or software is to be determined based on specific application and design constraints. A person of ordinary skill in the art may use different methods for different applications. Such implementations fall within the scope of the present disclosure.

A person having ordinary skill in the art can appreciate that descriptions of the functions and operations of the system, device, and unit can refer to the descriptions of the disclosed methods.

A person having ordinary skill in the art can appreciate that the various system, device, and method illustrated in the example embodiments may be implemented in other ways. For example, the disclosed embodiments for the device are for illustrative purpose only. Any division of the units are logic divisions. Actual implementation may use other division methods. For example, multiple units or components may be combined, or may be integrated into another system, or some features may be omitted or not executed. Further, couplings, direct couplings, or communication connections may be implemented using interfaces. The indirect couplings or communication connections between devices or units or components may be electrical, mechanical, or any other suitable type.

In the descriptions, when a unit or component is described as a separate unit or component, the separation may or may not be physical separation. The unit or component may or may not be a physical unit or component. The separate units or components may be located at a same place, or may be distributed at various nodes of a grid or network. The actual configuration or distribution of the units or components may be selected or designed based on actual need of applications.

Various functional units or components may be integrated in a single processing unit, or may exist as separate physical units or components. In some embodiments, two or more units or components may be integrated in a single unit or component. The integrated units may be realized using hardware, or may be realized using hardware and software functioning unit.

The disclosed functions may be realized using software functioning units and may be sold or used as an independent product. The software functioning units may be stored in a computer-readable medium as instructions or codes, such as a non-transitory computer-readable storage medium. Thus, the disclosed methods may be realized using software products. The computer software product may be stored in the computer-readable medium in the form of codes or instructions, which are executable by a computing device (e.g., a personal computer, a server, or a network device, etc.) or a processor to perform all or some of the steps of the disclosed methods. The non-transitory computer-readable storage medium can be any medium that can store program codes, for example, a USB disc, a portable hard disk, a read-only memory (ROM), a random access memory (RAM), a magnetic disk, an optical disk, etc.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:
1. An unmanned aerial vehicle, comprising:
    a propulsion system comprising:
        a driving device comprising a main body, a driving shaft rotatable relative to the main body, and a locking member disposed on the main body, the locking member comprising at least one snap-fitting member;
        a propeller coupled with the driving device, the propeller comprising a blade base and a blade mounted on the blade base, wherein the at least one snap-fitting member is configured to snap-fit with the propeller;
        an elastic abutting member sleeve coupled with the driving shaft;

a first installation foolproof member disposed on the blade base; and a second installation foolproof member disposed on the locking member, wherein the first installation foolproof member and the second installation foolproof member are configured to:

stagger from one another to allow the propeller to be mounted to the locking member when the propeller is mounted to the locking member in a first direction, and couple with one another to restrain the propeller from being mounted to the locking member, when the propeller is mounted to the locking member in a second direction different from the first direction, wherein:

the elastic abutting member is disposed between the main body and the blade base and abuts against the main body and the blade base.

2. The unmanned aerial vehicle of claim 1, wherein
the locking member comprises a through hole,
the driving shaft is disposed in the through hole, and
the elastic abutting member is disposed in the through hole.

3. The unmanned aerial vehicle of claim 1, wherein
the locking member comprises a connecting plate,
the snap-fitting member comprises a protruding column and a fitting block,
the protruding column extends from the connecting plate, and
the fitting block is disposed at an end of the protruding column.

4. The unmanned aerial vehicle of claim 3, wherein
the protruding column is perpendicular to the connecting plate, and
the blocking member is perpendicular to the protruding column.

5. The unmanned aerial vehicle of claim 1, wherein
the snap-fitting member comprises a plurality of through holes disposed at a predetermined interval,
the through holes extend along an arc using an axis of the driving shaft as a rotation center,
stepping blocks are each disposed in a corresponding one of the through holes and are configured to connect with the propeller, and
each of the stepping blocks is disposed on a side of the corresponding one of the through holes and has a height smaller than a depth of the corresponding one of the through holes.

6. The unmanned aerial vehicle of claim 1, wherein
the snap-fitting member comprises a positioning member,
the positioning member and the snap-fitting member are disposed on two opposite surfaces of the locking member,
the main body comprises a positioning groove corresponding to the positioning member, and
when the locking member is connected with the main body, the positioning member is disposed in the positioning groove.

7. The unmanned aerial vehicle of claim 6, wherein
the positioning member is a blocking ring, and the positioning groove is a ring-shaped groove.

8. The unmanned aerial vehicle of claim 7, wherein
the blocking ring forms a receiving groove, and an end of the elastic abutting member is received and positionally limited in the receiving groove.

9. The unmanned aerial vehicle of claim 6, wherein
the positioning member comprises a plurality of cylindrical rods,
the positioning groove comprises a plurality of circular holes, and
each of the cylindrical rods corresponds to one of the circular holes.

10. The unmanned aerial vehicle of claim 9, wherein
the locking member comprises a receiving groove formed on a surface of the locking member that is adjacent the main body, and
an end of the elastic abutting member is received and positionally limited in the receiving groove.

11. The unmanned aerial vehicle of claim 10, wherein
the elastic abutting member is an elastic component disposed on the main body.

12. The unmanned aerial vehicle of claim 11, wherein
the elastic component is a spring.

13. The unmanned aerial vehicle of claim 1, wherein
the blade base comprises a connecting column and a connecting hole, and
the connecting hole is provided on the connecting column to receive the driving shaft of the driving device.

14. The unmanned aerial vehicle of claim 13, wherein
the blade base comprises at least one fastening member surrounding the connecting hole, the at least one fastening member corresponding to the snap-fitting member of the driving device,
the fastening member comprises a rib and a blocking strip, and
the rib and the blocking strip are perpendicular to one another.

15. The unmanned aerial vehicle of claim 14, wherein
the connecting column comprises a reinforcing plate disposed on an outer side wall.

16. The unmanned aerial vehicle of claim 15, wherein
the rib extends along an arc shape from an end portion of the reinforcing plate along an inner wall of the connecting column, and
the blocking strip is disposed at an end portion of the rib in a rotation direction of the blade when the blade is in operation.

17. The unmanned aerial vehicle of claim 15, wherein
the reinforcing plate comprises the first installation foolproof member along a rotation direction of the blade, and
the first installation foolproof member and the blocking strip are disposed on a same side of the reinforcing plate.

18. The unmanned aerial vehicle of claim 14, wherein
the rib is configured to extend perpendicularly from the blade base, and
the blocking strip is provided at an end of the rib and protrudes in a direction that is away from the connecting hole.

19. The unmanned aerial vehicle of claim 18, wherein:
the first installation foolproof member is disposed between the rib and the connecting hole, the first installation foolproof member extending in the same extending direction as the rib, and
a height of the rib is greater than a height of the first installation foolproof member.

* * * * *